Figure 1:
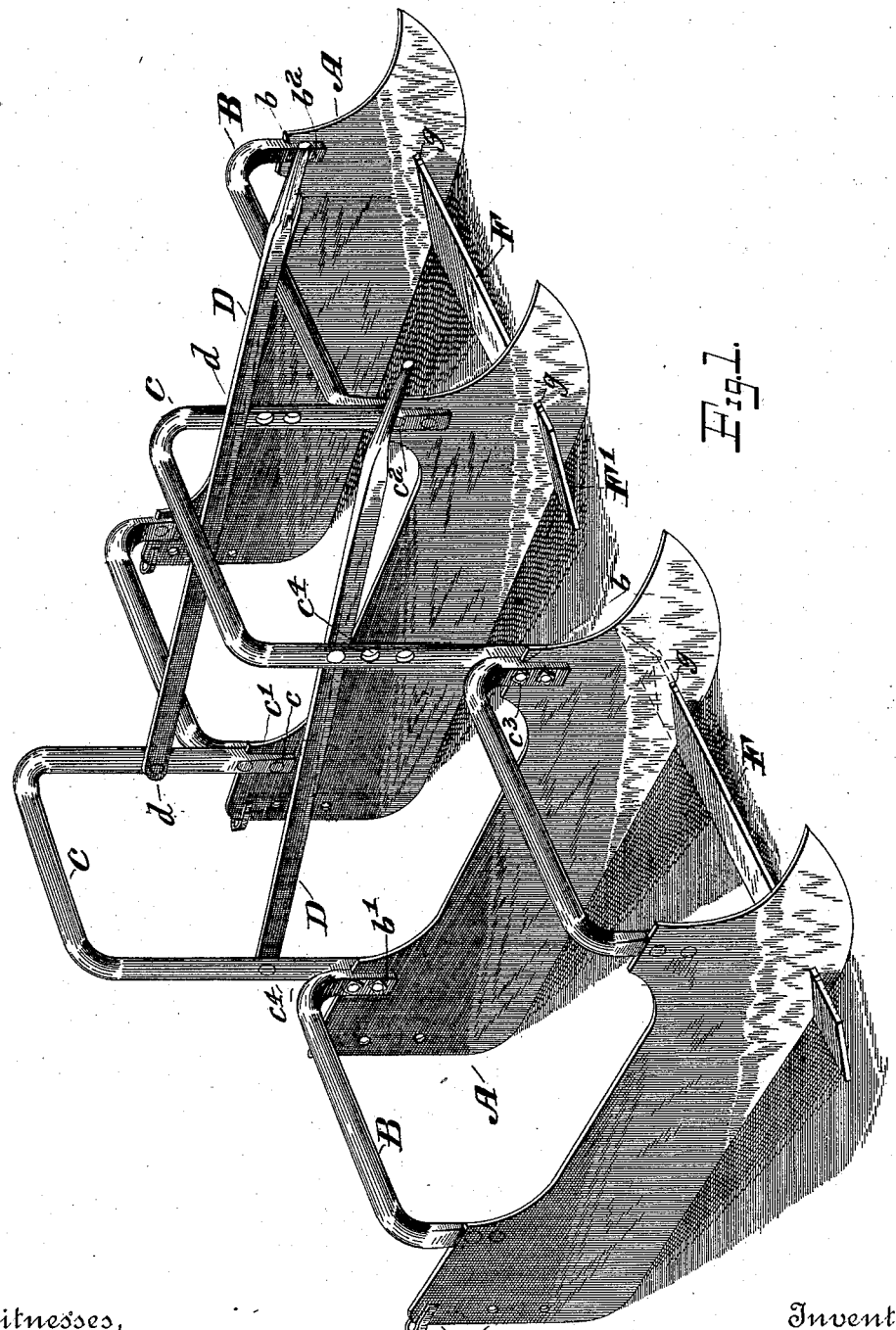

(No Model.) 2 Sheets—Sheet 1.

J. W. MULVEY.
HOE CULTIVATOR.

No. 384,267. Patented June 12, 1888.

Witnesses,
Arthur Ashley.
James F. DuHamel.

Inventor.
James W. Mulvey, M.D.
By J. A. Ashley, atty.

(No Model.) 2 Sheets—Sheet 2.
J. W. MULVEY.
HOE CULTIVATOR.
No. 384,267. Patented June 12, 1888.
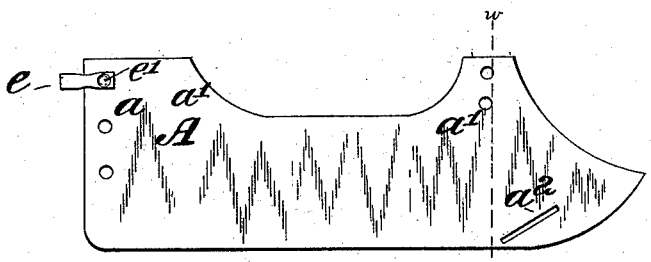 
Fig.2. Fig.3.
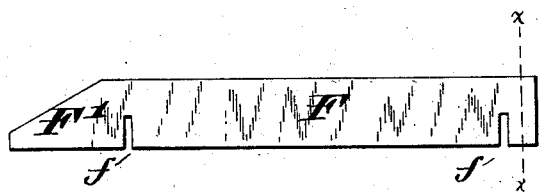 
Fig.4. Fig.5.
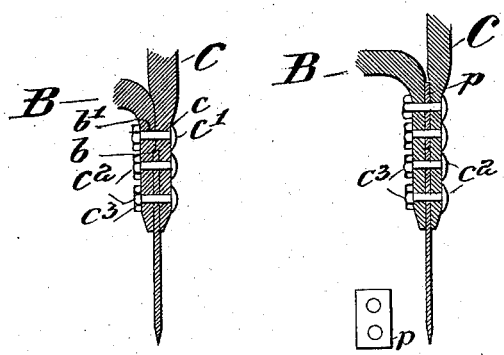
Fig.6. Fig.7.
Witnesses.
Arthur Ashley.
James P. DuHamel.
Inventor.
James W. Mulvey, M.D.
By J. A. Ashley, atty.

UNITED STATES PATENT OFFICE.

JAMES W. MULVEY, OF JONESVILLE, INDIANA.

HOE-CULTIVATOR.

SPECIFICATION forming part of Letters Patent No. 384,267, dated June 12, 1888.

Application filed February 6, 1888. Serial No. 263,101. (No model.)

*To all whom it may concern:*

Be it known that I, JAMES W. MULVEY, a citizen of the United States, residing in Jonesville, in the county of Bartholomew, in the State of Indiana, have invented a new and useful Hoe-Cultivator, of which the following is a description.

The object of the invention is to produce a two-horse cultivating implement in the operation of which the entire surface of the soil to the depth of a few inches shall be quickly and thoroughly agitated and pulverized, disturbance of the roots of the plants shall be avoided, and all weeds shall be uprooted and cast upon the surface, exposed to the destructive action of the rays of the sun.

As the title signifies, the invention relates to the class of cultivating implements which partake of the character of both a hoe and a cultivator. In other words, while its locomotion is produced by animal-power, and while its action is modified and directed to some extent by hand-power from behind as it advances across the field, its relation to the soil and its action upon it is that of a hoe rather than that of a plow—that is, the soil which is engaged is drawn slightly in the direction of the propelling-power, falling behind the top or upper rear edge of the hoe as it advances, as in the use of the ordinary hand-hoe, instead of being thrown outward to the right or to the left, as in the operation of plow-cultivators as generally constructed.

The invention consists in a hoe-cultivator which is provided with a series of longitudinally-arranged cutting and supporting shoes, carriers, or runners, connections by which such shoes, carriers, or runners are held in a vertical position and maintained in parallelism, two oppositely-placed hoes which extend transversely of the carriers and are firmly but detachably secured thereto, and suitable handles for adjusting the implement in its relation to the soil and to the growing plants.

The invention consists, also, in various novel parts, features, and combinations, as will be particularly described, and then distinctly summarized in the claims.

In the drawings, Figure 1 represents a view in perspective of my improved hoe-cultivator. Fig. 2 is a side view of one of the carriers or shoes detached. Fig. 3 is a transverse section on the line $w\,w$ in Fig. 2. Fig. 4 is a side view of one of the hoes detached. Fig. 5 is a transverse section on the line $x\,x$ of Fig. 4. Fig. 6 is a detail showing a partial vertical transverse section of the supporting arch-bars and of one of the carriers or shoes which is embraced between them. Fig. 7 is a detail showing a modification of the construction represented in Fig. 6.

Each of the long and narrow shoes A is preferably of the form shown—that is, the front end is straight and vertical. The lower edge, as a whole, is at a right angle with the vertical front end, but is curved upwardly from a point near its rear extremity. The straight portion of the upper edge is substantially parallel with the lower edge. A series of perforations, $a$, is provided near the front end to receive the securing pin or bolt $e'$ of the clevis $e$. Two or more perforations, $a'$, are provided near the upper edge at a short distance from the front and rear ends, and an oblong rectangular inclined perforation or slot, $a^2$, is provided near the rear extremity, or, so to speak, through the heel of the shoe.

The four shoes are arranged in two pairs, as represented, the members of which are connected together by the arch-bars B, each of which has at each end, in its exterior face, a recess, $b$, and two or more transverse perforations, $b'$. The central arch-bars, C, have at each end similar lateral recesses, $c'$, a series of transverse perforations, $c$, which are so spaced as to correspond with the perforations $b'$ in the arch-bars B and with the perforations $a'$ in the shoes or carriers A, and they are provided, also, with another series of transverse perforations, $c^4$, in any required number, for adjustable attachment by suitable bolts, $d$, of the two handles D.

The exterior ends of the arch-bars B may be attached to the corresponding shoes, either by rivets or by detachable bolts $b^2$, while the opposite inner ends are placed coincidently with the intermediate arch-bars, C, and are secured to the same and to the corresponding inner shoe by the bolts $c^2$ and their corresponding nuts, $c^3$.

The slot $a^2$ in the shoes A, beginning at a point near the lower edge of the shoe, extends obliquely upward and rearward at an angle, preferably, of about thirty-five degrees with such lower edge to a distance corresponding with the width of the hoes.

The two coincidently-placed hoes or blades F are essentially of the form represented in Figs. 1 and 4—that is, oblong and rectangular in their main portion, provided in their edges with the short transverse slots $f$, which coincide with and receive the lower edge of the shoes, and tapered at their inner projecting ends, F', from the top downwardly to the bottom edge thereof.

The shoes are composed of steel, and the lower portion of the front end and the lower edge, from the front to a point at or near the crossing of the hoe, is made sharp. The hoes also are of steel, and the lower edge thereof is made sharp from end to end. The securing wedges or plates $g$ are readily removed when it is desired to detach the hoes for sharpening or for renewal, and when the hoes are thus detached the bolts $c^2$ may be removed to permit detachment of the shoes for like purposes.

The arch-bars and the handles being of iron, it will be apparent that the implement is strong and durable without being weighty. If the arch-bars C be of one and one-fourth inch square iron and six feet four inches in length, and if the arch-bars B be of square iron one inch in diameter and thirty-four inches in length, the shoes being thirty inches in length, seven inches in their greatest width, and one-fourth of one inch in thickness, the entire weight will be but one hundred pounds.

The projection of the hoes below the edge of the shoes is preferably about one-fourth inch, and their inclination is, as before indicated, about the same as that of the ordinary hand-hoe as commonly used.

Under the construction thus described the shoes will readily penetrate and cut the soil, whether it be light and friable or turfy and tough, of stiff and heavy clay, or of sand and gravel; and when it is thus divided, as it were, into sections, it is easily taken up by the hoes and carried forward a short distance, when, being thoroughly comminuted, it will, together with any accumulations of weeds or other substances which may have been lifted therewith, pass rearwardly over the upper edge of the hoes and fall behind into substantially the same position which it before occupied.

Under the dimensions already specified each of the arches is of a span of sixteen inches, measuring from center to center of the vertical portions thereof, and the exterior projections of the hoes being by preference about two inches the implement is of an extreme width of about four and one-half feet. The interval between the inner ends of the hoes being, as here represented, eight inches, it follows that each row is cultivated upon both sides at once to a point within four inches of its center, and that if the field be cultivated both longitudinally and transversely its entire surface, except the eight inches at the intersection of the rows, will have been subjected to the pulverizing action of the hoes.

The line of draft and the depth of the hold of the hoes may be varied, as circumstances may require, by adjustment of the clevises to which the singletrees and draft-chains are attached higher or lower in the series of perforations $a$.

The location of the hoes in the rear portion of the implement at the heel of the carrying-shoes and the upward curvature of the edge of the shoe from that point rearwardly enable the operator through the medium of the handles to vary the inclination of the hoes either in a vertical or in a horizontal plane instantly and with the utmost facility, and thus to either increase or diminish the engagement of the hoes with the soil, or by the same means to turn the implement slightly to the right or to the left if any portion of the row should be found somewhat out of line.

The inclination of the upper edge of the hoes at their coincident inner ends avoids that accumulation or heaping of the soil which would at times result if these ends were of the full width of the main body of the hoes, and thus avoids covering the plants with soil in the earlier stages of their growth—an occurrence which would sometimes be unavoidable if the hoes were at this point of the full width of the main body thereof.

Although I have herein specified with some particularity the dimensions, form, and proportions of my improved hoe-cultivator and its parts as I have found it advantageous to construct it and under which its use has been attended with entirely satisfactory results, it will be obvious that each might be somewhat changed or varied without departing from the spirit of my invention and without affecting the operation of the implement or the results arising from its use. For instance, the entire implement might be made either smaller or larger to adapt it to closer or to more open planting, the inclination of the heel of the shoes might be of a straight instead of the curved form, the incline of the inner end of the hoes might be curved either upwardly or downwardly, and various other minor changes might be made without involving any patentable variations from my invention.

In some cases it may be desirable to make the arch-bars C and the inner ends of the arch-bars B without the lateral recesses $c'$ and $b$, and when this is done a perforated plate, $p$, corresponding in thickness with the shoes or carriers, is applied above the same and between the arch-bars, as represented in Fig. 7.

An important incidental advantage due to the described construction is found in the fact that the implement may be easily constructed in all its parts by any blacksmith of ordinary skill.

Having described my invention, I claim—

1. A cultivating implement which embraces two pairs of parallel shoes which have cutting-edges, connecting-bars which secure such pairs of shoes together, and a forwardly and downwardly inclined hoe in each pair of shoes, secured by its ends in each member of such pair, substantially as described.

2. In a cultivating implement, the combination, with a series of cutting shoes or runners, of two coincident inclined hoes or cutters which are arranged transversely of the shoes or runners and are secured therein at a distance apart corresponding to the width of the rows of plants, and handled bars which connect the hoe-carrying shoes, and which are of such conformation as to bestride and pass over and along the rows of plants, substantially as and for the purposes set forth.

3. The combination, in a cultivator, of the described pairs of shoes or runners having cutting-edges and connected together as shown, each pair being provided with a transversely-placed inclined hoe, the inner end of each of which extends through the inner member of its pair of shoes or runners, substantially as and for the purposes set forth.

4. In a cultivator for plants in rows, the combination, with a pair of cutting shoes or runners, each of which is provided with a forwardly and downwardly inclined slot which is closed above and below, of a hoe which is adapted to such slots, and which projects through the same, and which is provided in its lower portion with an open slot of a width corresponding to the thickness of the shoe or runner, whereby the upper portion of the hoe is embraced by the slot in the shoe or runner, and whereby the lower portion of the shoe or runner is embraced by the slot in the hoe, substantially as described.

JAMES W. MULVEY.

Witnesses:
R. M. FORD,
T. G. WILSON.